(12) United States Patent
Yano et al.

(10) Patent No.: US 10,208,800 B2
(45) Date of Patent: Feb. 19, 2019

(54) SEALED THRUST BALL BEARING

(71) Applicants: JTEKT CORPORATION, Osaka-shi (JP); NAKANISHI METAL WORKS CO., LTD., Osaka-shi (JP)

(72) Inventors: Hiroshi Yano, Osaka (JP); Yoshio Horikawa, Osaka (JP)

(73) Assignees: JTEKT CORPORATION, Osaka-shi (JP); NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 15/646,574

(22) Filed: Jul. 11, 2017

(65) Prior Publication Data

US 2018/0023626 A1  Jan. 25, 2018

(30) Foreign Application Priority Data

Jul. 25, 2016 (JP) ................................. 2016-145699

(51) Int. Cl.
*F16C 19/10* (2006.01)
*F16C 33/76* (2006.01)
(Continued)

(52) U.S. Cl.
CPC ............ *F16C 33/761* (2013.01); *F16C 19/10* (2013.01); *F16C 19/163* (2013.01);
(Continued)

(58) Field of Classification Search
CPC .... F16C 19/10; F16C 19/163; F16C 33/7823; F16C 2326/05; F16C 33/7879;
(Continued)

(56) References Cited

U.S. PATENT DOCUMENTS 4,608,741 A * 9/1986 Mallet ................... F16C 19/163
192/110 B
5,618,116 A * 4/1997 Ishikawa ................. F16C 19/10
277/361
(Continued)

FOREIGN PATENT DOCUMENTS

JP  H05-40328 Y2  10/1993
JP  2002-227861 A1  8/2002
(Continued)

*Primary Examiner* — Marcus Charles
(74) *Attorney, Agent, or Firm* — Kratz, Quintos & Hanson, LLP

(57) ABSTRACT

The inner elastic sealing member 5 includes an inner cylindrical base portion 5A leading to an end portion of an inner cylindrical portion 1B of the inner ring 1, and also includes, at an outer circumferential surface of the inner cylindrical base portion 5A, a projection 7 extending radially outward of an inner periphery of a lower end of an inner cylindrical portion 2B of the outer ring 2. The outer elastic sealing member 6 includes a lip 6B brought into pressure contact with a pressure contact surface B of the outer ring 2. An upper surface 7A of the projection 7 is spaced downward from the lower end of the inner cylindrical portion 2B of the outer ring 2, and an outer circumferential surface 7C of the projection 7 is spaced radially inward from the lower member 8.

4 Claims, 8 Drawing Sheets

(51) Int. Cl.
  *F16C 33/78* (2006.01)
  *F16J 15/16* (2006.01)
  *F16C 19/16* (2006.01)
  *F16C 33/80* (2006.01)
  *F16J 15/34* (2006.01)
  *B60G 15/06* (2006.01)

(52) U.S. Cl.
  CPC ...... *F16C 33/7823* (2013.01); *F16C 33/7859* (2013.01); *F16C 33/7886* (2013.01); *F16C 33/805* (2013.01); *B60G 15/068* (2013.01); *B60G 2204/416* (2013.01); *F16C 2326/05* (2013.01); *F16J 15/3464* (2013.01); *Y10T 29/49645* (2015.01); *Y10T 29/49703* (2015.01)

(58) Field of Classification Search
  CPC .. F16C 33/761; F16C 33/7886; F16C 33/805; F16C 33/7859; B60G 15/168; B60G 2204/416; F16J 15/3468; Y10T 29/49645; Y10T 29/49703; F16F 33/3464
  USPC ...... 384/477, 482, 484, 590, 607, 609, 615, 384/622, 617; 29/898.11; 277/345, 349, 277/351, 353
  See application file for complete search history.

(56) References Cited

U.S. PATENT DOCUMENTS

| | | | | |
|---|---|---|---|---|
| 6,464,060 | B1* | 10/2002 | Ponson | F16D 23/142 192/110 B |
| 6,684,997 | B2* | 2/2004 | Klopfer | F16D 13/755 192/110 B |
| 8,348,512 | B2* | 1/2013 | Dittmer | F16D 23/14 29/898.11 |
| 8,534,926 | B2* | 9/2013 | Suzuki | F16C 19/163 192/98 |
| 9,581,213 | B2* | 2/2017 | Lee | F16F 1/127 |
| 2012/0146306 | A1* | 6/2012 | Dubus | B60G 15/068 280/124.155 |
| 2013/0313766 | A1* | 11/2013 | Bussit | B60G 15/068 267/195 |
| 2014/0023307 | A1* | 1/2014 | Stautner | F16C 33/583 384/615 |

FOREIGN PATENT DOCUMENTS

JP 4748050 B2 8/2011
WO WO-2010023051 A1 * 3/2010 ............ F16D 23/14

* cited by examiner

SEALED THRUST BALL BEARING

BACKGROUND OF THE INVENTION

Field of the Invention

The present invention relates to a sealed thrust ball bearing for use in a strut type suspension device for a vehicle, or the like, and more specifically relates to a structure for preventing separation between an inner ring and an outer ring in the sealed thrust ball bearing.

Description of the Related Art

A sealed thrust ball bearing used between an upper mount and a lower mount in a strut type suspension device, which is widely used as an independent suspension for a vehicle, includes an inner ring and an outer ring opposing each other in the axial direction of the bearing, a plurality of balls arranged between opposing surfaces of the inner ring and the outer ring so as to be able to roll, and an inner elastic sealing member and an outer elastic sealing member which seal between inner circumferential portions of the inner ring and the outer ring and between outer circumferential portions of the inner ring and the outer ring (see, for example, Patent Literature 1 to 3).

The elastic sealing members have a function to prevent entry of foreign matter such as muddy water into the bearing and leak of grease filled within the bearing, and also have a function to prevent separation between the inner ring and the outer ring.

For example, in the sealed thrust ball bearing of Patent Literature 3, an outer elastic sealing member (6) integrated with an inner ring (1) includes a lip (6A) extending radially inward toward a pressure contact surface of an outer ring (2), and also includes, above the lip (6A), an outer cylindrical base portion leading to an end portion of an outer cylindrical portion (1C) of the inner ring (1).

The pressure contact surface is tilted such that, in assembling the inner ring (1) and the outer ring (2) such that the inner ring (1) and the outer ring (2) come close to each other in the axial direction, after the lip (6A) elastically deforms, the lip (6A) reverses and elastically deforms in the direction opposite to the direction of the elastic deformation at the time of completion of assembling, whereby, at the time of completion of assembling, the restoring force of the elastic deformation of the lip is applied to the tilted pressure contact surface.

As described above, the assembling work is completed in a state where, after elastic deformation of the lip (6A), the lip (6A) has reversed and elastically deformed in the direction opposite to the direction of the deformation, and the lip (6A) is brought into pressure contact with the tilted pressure contact surface in a state where the assembling work is completed. Because of this configuration, a load required for moving the inner ring and the outer ring away from each other in the axial direction to separate the inner ring and the outer ring from each other (hereinafter, referred to as "separation load") can be increased without increasing the restoring force of the elastic deformation of the lip (6A), thereby making it less likely to separate the inner ring and the outer ring from each other.

Therefore, the sealed thrust ball bearing of Patent Literature 3 has a feature in that the function to prevent separation between the inner ring and the outer ring can be improved while an increase in the running torque of the bearing is inhibited.

CITATION LIST

Patent Literature

[PTL 1] Japanese Examined Utility Model Application Publication No. H05-40328
[PTL 2] Japanese Unexamined Patent Application Publication No. 2002-227861
[PTL 3] Japanese Patent No. 4748050

Even when a sealed thrust ball bearing having a function to prevent separation between an inner ring and an outer ring is used, the inner ring and the outer ring of the sealed thrust ball bearing may be separated from each other during work for assembly, maintenance inspection, repair, or the like of mechanical components including the sealed thrust ball bearing.

Therefore, further enhancement of the function to prevent separation between the inner ring and the outer ring of the sealed thrust ball bearing is required in order to increase the work efficiency, and it is necessary to further increase the separation load in order to meet such need.

However, in order to further increase the separation load, it is necessary to increase the force for bringing the lip into pressure contact, and thus the running torque of the bearing is increased.

That is, increasing the separation load as much as possible and reducing the running torque of the bearing as much as possible contradict each other. Thus, it is not possible to further increase the separation load while reducing the running torque as much as possible.

In this regard, the same applies to the sealed thrust ball bearing of Patent Literature 3. The sealed thrust ball bearing of the Patent Literature 3 has the above feature, but can be said to have room for improvement from the standpoint of further enhancing the function to prevent separation between the inner ring and the outer ring while inhibiting an increase in the running torque of the bearing.

SUMMARY OF THE INVENTION

Therefore, the present invention has been made in view of the above-described circumstances, and an object of the present invention is to provide a sealed thrust ball bearing which is able to significantly enhance a function to prevent separation between an inner ring and an outer ring while inhibiting an increase in the running torque of the bearing.

In order to attain the above object, a sealed thrust ball bearing according to an aspect of the present invention includes:

an inner ring and an outer ring opposing each other in an axial direction;

a plurality of balls arranged between opposing surfaces of the inner ring and the outer ring so as to be able to roll; and an inner elastic sealing member and an outer elastic sealing member which seal between inner circumferential portions of the inner ring and the outer ring and between outer circumferential portions of the inner ring and the outer ring and are integrated with the inner ring by coating the inner ring with an elastic body, the sealed thrust ball bearing being used by assembling the outer ring to a lower member disposed below the outer ring, wherein the inner elastic sealing member includes an inner cylindrical base portion leading to an end portion of an inner cylindrical portion of the inner ring, and also includes, at an outer circumferential surface of the inner cylindrical base portion, a projection extending radially outward of an inner periphery of a lower end of an inner cylindrical portion of the outer ring, the outer elastic sealing member includes a lip extending radially inward so as to be brought into pressure contact with a pressure contact surface in a radially outer surface of the outer ring, and at a time of completion of assembling the inner ring, the outer ring, and the lower member, an upper surface of the projection of the inner elastic sealing member is spaced downward from the lower end of the inner cylindrical portion of the outer ring, and an outer circumferential surface of the projection is spaced radially inward from the lower member.

With this configuration, when the inner ring and the outer ring are moved in a direction in which the inner ring and the outer ring are away from each other in the axial direction, the projection, which is provided at the inner cylindrical base portion of the inner elastic sealing member of the inner ring and extends radially outward, is stopped by the lower end of the inner cylindrical portion of the outer ring. Thus, a separation load is significantly increased.

Moreover, at the time of completion of assembling the inner ring, the outer ring, and the lower member, the upper surface of the projection is spaced downward from the lower end of the inner cylindrical portion of the outer ring, and the outer circumferential surface of the projection is spaced radially inward from the lower member. Thus, during rotation of the bearing, the projection does not come into contact with another component, so that the running torque of the bearing does not increase.

Furthermore, since the outer circumferential surface of the projection extending radially outward is spaced radially inward from the lower member, the projection also serves as a labyrinth seal by adjusting the gap therebetween.

Objects, features, aspects and advantages of the present invention will become more apparent from the following detailed description of the present invention when taken in conjunction with the accompanying drawings.

DESCRIPTION OF THE PREFERRED EMBODIMENTS

Next, embodiments of the present invention will be described in detail with reference to the accompanying drawings. The present invention is not limited to the embodiments shown in the accompanying drawings and includes all embodiments that meet the requirements described in the claims. In the present specification, the axial direction of a bearing is defined as up-down direction, and a direction in which an inner ring is assembled to an outer ring disposed at a lower side from above is defined as "assembling direction".

Embodiment 1

<Structure of Sealed Thrust Ball Bearing>

Figure 1:
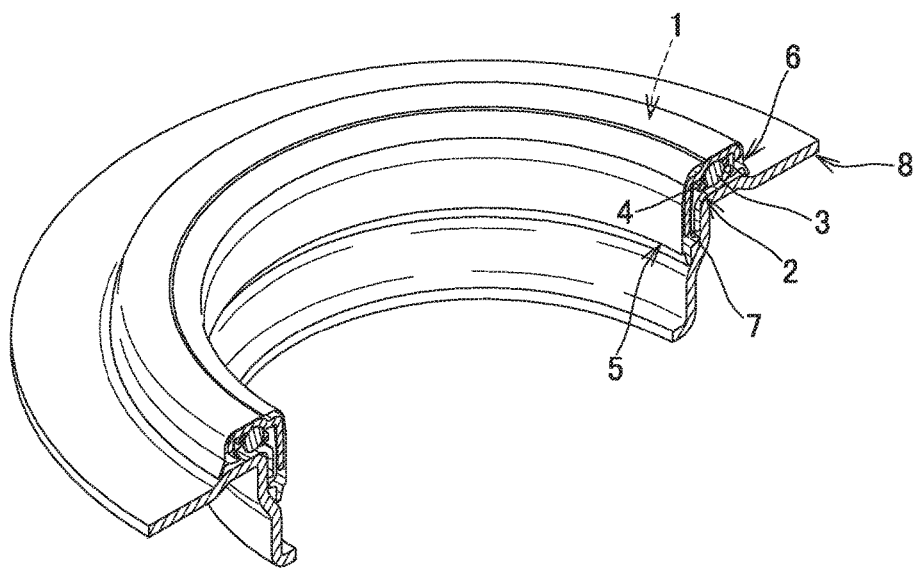
FIG. 1 is a longitudinal cross-sectional perspective view of a sealed thrust ball bearing according to Embodiment 1 of the present invention.
Figure 2:
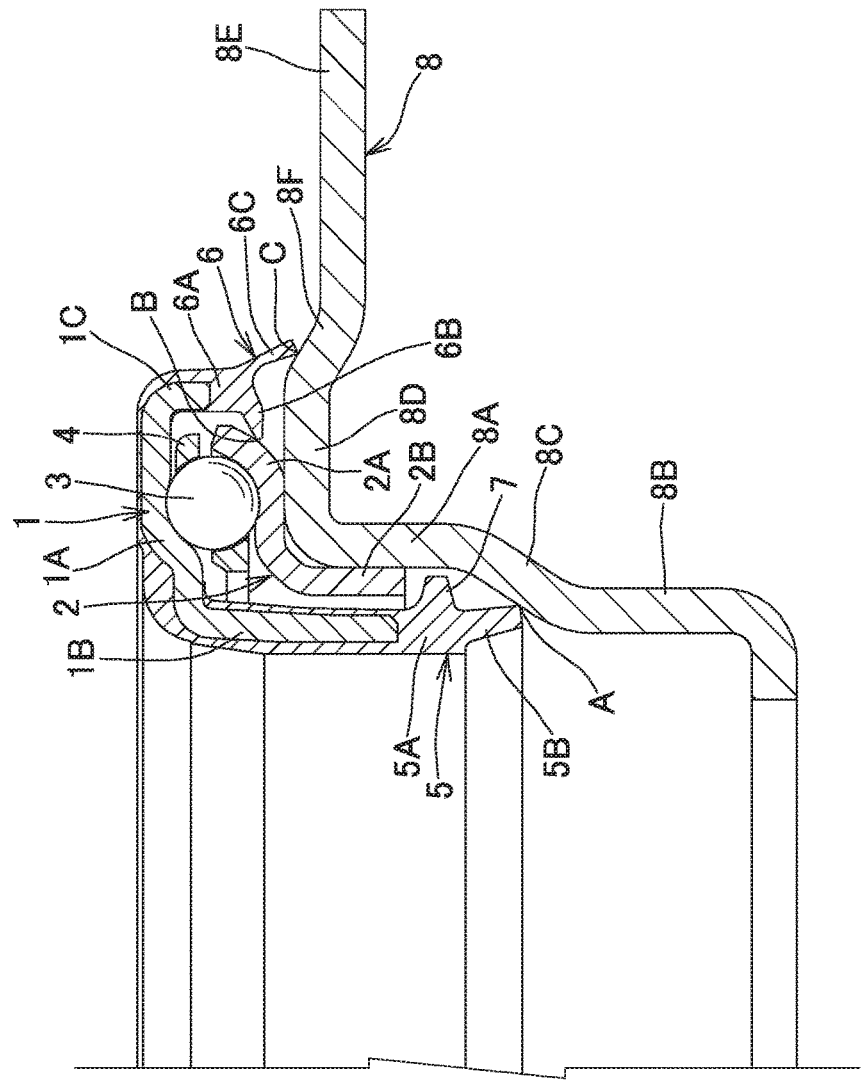
FIG. 2 is an enlarged longitudinal cross-sectional side view of a main part of the sealed thrust ball bearing.

As shown in a longitudinal cross-sectional perspective view of FIG. 1 and a longitudinal cross-sectional side view of FIG. 2, a sealed thrust ball bearing according to Embodiment 1 of the present invention includes: an annular inner ring 1 and an annular outer ring 2 which oppose each other in the axial direction thereof; a plurality of balls 3 which are arranged between opposing surfaces of the inner ring 1 and the outer ring 2 so as to be able to roll and are retained by a retainer 4; and an inner elastic sealing member 5 and an outer elastic sealing member 6 which seal between inner circumferential portions of the inner ring 1 and the outer ring 2 and between outer circumferential portions of the inner ring 1 and the outer ring 2 and are integrated with the inner ring 1 by coating the inner ring 1 with an elastic body. Grease which is a lubricant is filled between the inner ring 1 and the outer ring 2.

The sealed thrust ball bearing shown in the present embodiment is structured to be used for a strut suspension for an automobile, and the outer ring 2 is assembled to and integrated with a spring sheet 8 which is a lower member disposed below the outer ring 2 and which is to be a portion for receiving a spring.

The spring sheet 8 includes: a cylindrical portion 8A which is a radially inner upper portion; a cylindrical portion 8B which is located below the cylindrical portion 8A and reduced in diameter; a tilt portion 8C which connects the cylindrical portions 8A and 8B; a flange portion 8D which extends radially outward from an upper end portion of the cylindrical portion 8A; a flange portion 8E which extends outward so as to be stepped down from the flange portion 8D; and a tilt portion 8F which connects the flange portions 8D and 8E.

Here, each of the inner ring 1, the outer ring 2, and the spring sheet 8 is produced by presswork of a steel plate, the balls 3 are formed from steel, and the retainer 4 is formed from a synthetic resin.

In addition, the inner elastic sealing member 5 and the outer elastic sealing member 6 are integrated with the inner ring 1 by coating the inner ring 1 as a core metal with an elastic body such as a synthetic rubber through adhesion by vulcanization, and are each configured to have an end portion with a lip structure.

As a rubber material to be used for the elastic body, one or more rubbers as rubber materials having favorable oil resistance, among rubbers such as nitrile rubber (NBR), hydrogenated nitrile rubber (HNBR), acrylic rubber (ACM), ethylene-acrylic rubber (AEM), fluororubber (FKM, FPM), and silicone rubber (VQM), may be blended as appropriate and used.

In addition, when kneadability, vulcanization moldability, and adhesion to the inner ring 1, which is the core metal, of the rubber material are taken into consideration, blending and using the rubber material with another rubber such as liquid NBR, ethylene-propylene rubber (EPDM), natural rubber (NR), isoprene rubber (IR), styrene-butadiene rubber (SBR), and butadiene rubber (BR) is also preferable.

In the longitudinal cross-sectional side view of FIG. 2, a curved portion 1A of the inner ring 1 and a curved portion 2A of the outer ring 2 are formed as a raceway portion for the balls 3, the inner elastic sealing member 5 is provided below an inner cylindrical portion 1B extending downward at a radially inner portion of the inner ring 1, and the outer elastic sealing member 6 is provided below an outer cylindrical portion 1C extending downward at a radially outer portion of the inner ring 1.

The outer ring 2 has an inner cylindrical portion 2B formed so as to extend downward at a radially inner portion thereof, the inner cylindrical portion 2B is press-fitted to the inner diameter side of the cylindrical portion 8A of the spring sheet 8, and the lower surface of a horizontal portion extending from a lower portion of the curved portion 2A of the outer ring 2 to an upper end portion of the inner cylindrical portion 2B is brought into contact with the upper surface of the flange portion 8D of the spring sheet 8.

<Structure and Function of Inner Elastic Sealing Member>

As shown in the longitudinal cross-sectional side view of FIG. 2, the inner elastic sealing member 5 includes an inner cylindrical base portion 5A leading to an end portion of the inner cylindrical portion 1B of the inner ring 1, and also includes, below the inner cylindrical base portion 5A, a lip 5B which is brought into pressure contact with a pressure contact surface A in the radially inner surface of the spring sheet 8.

Figure 3A:
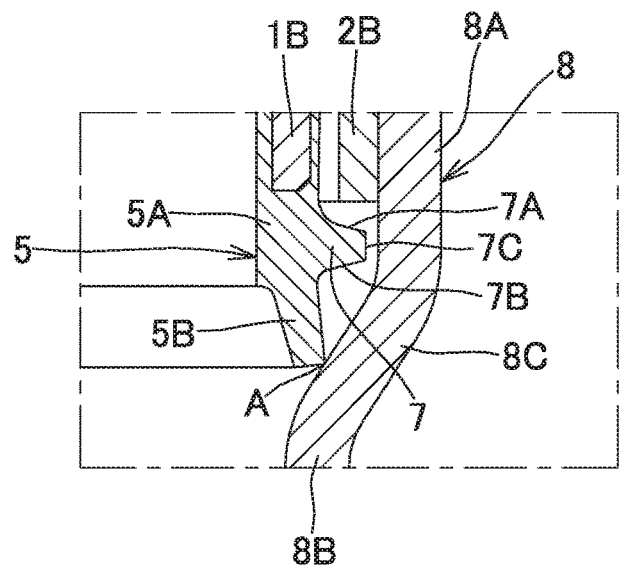
FIG. 3A is an enlarged longitudinal cross-sectional side view around an inner elastic sealing member.

The inner cylindrical base portion 5A includes, at the outer circumferential surface, a projection 7 extending radially outward of the inner periphery of the lower end of the inner cylindrical portion 2B of the outer ring 2. As shown in a longitudinal cross-sectional side view of FIG. 3A, at the time of completion of assembling the inner ring 1, the outer ring 2, and the spring sheet 8, an upper surface 7A of the projection 7 is spaced downward from the lower end of the inner cylindrical portion 2B of the outer ring 2, and an outer circumferential surface 7C of the projection 7 is spaced radially inward from the spring sheet 8.

Figure 3B:
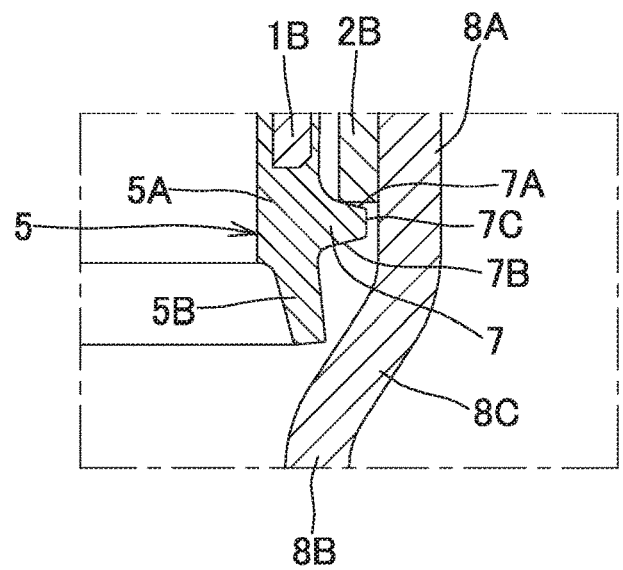
FIG. 3B is a longitudinal cross-sectional side view showing a state where an inner ring and an outer ring are moved in a direction in which the inner ring and the outer ring are away from each other in an axial direction, and a projection of an inner elastic sealing member is stopped by the lower end of an inner cylindrical portion of the outer ring.

Here, as shown in a longitudinal cross-sectional side view of FIG. 3B, when the inner ring 1 and the outer ring 2 are moved in a direction in which the inner ring 1 and the outer ring 2 are away from each other in the axial direction, the upper surface 7A of the projection 7 comes into contact with the lower end of the inner cylindrical portion 2B of the outer ring 2 and is stopped thereby. Thus, the projection 7 has a function to prevent separation between the inner ring 1 and the outer ring 2.

The projection 7, which extends radially outward from the outer circumferential surface of the inner cylindrical base portion 5A, is formed, for example, over the entire circumference of the inner cylindrical base portion 5A (formed in an endless shape), but may be formed on only a part, in the circumferential direction, of the inner cylindrical base portion 5A.

<Structure and Function of Outer Elastic Sealing member>

As shown in the longitudinal cross-sectional side view of FIG. 2, the outer elastic sealing member 6 includes a main lip 6B extending radially inward so as to be brought into pressure contact with a pressure contact surface B in the outer circumferential surface of the curved portion 2A of the outer ring 2, and a dust lip 6C extending downward so as to be brought into pressure contact with a pressure contact surface C in the upper surface of the tilt portion 8F of the spring sheet 8, and also includes, above the main lip 6B, an outer cylindrical base portion 6A leading to an end portion of the outer cylindrical portion 1C of the inner ring 1.

Here, the main lip 6B has a function to prevent leak of the grease filled within the bearing and a function to prevent separation between the inner ring 1 and the outer ring 2, and the dust lip 6C has a function to prevent entry of foreign matter such as muddy water from the outside.

<Work for Assembling Inner Ring to Outer Ring>
Inner Elastic Sealing member)

Figure 4:
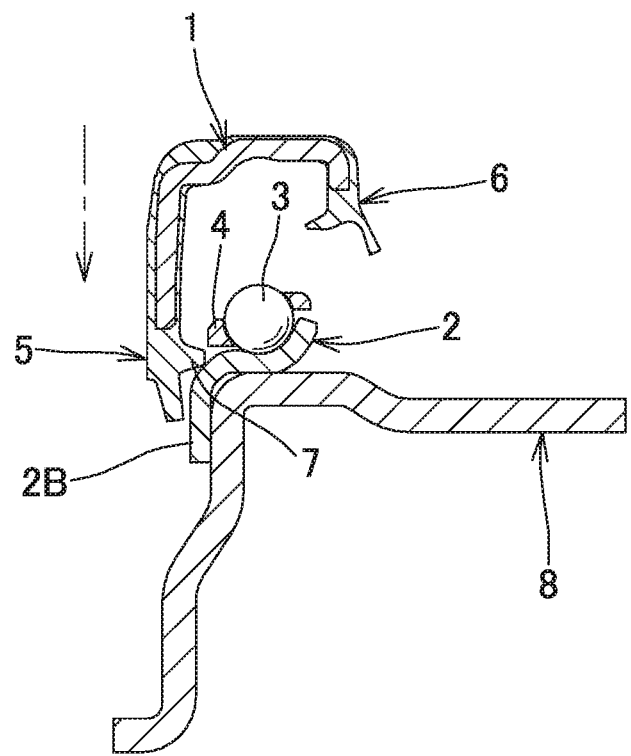
FIG. 4 is a schematic longitudinal cross-sectional end view showing a state where the projection of the inner elastic sealing member is brought into contact with the outer ring from above during work for assembling the inner ring to the outer ring.

In performing work for assembling the inner ring 1 to the outer ring 2, when the inner ring 1 is moved in the assembling direction relative to the outer ring 2 as shown by an arrow in a schematic longitudinal cross-sectional end view of FIG. 4, the projection 7 of the inner elastic sealing member 5 comes into contact with the outer ring 2 from above.

When the inner ring 1 is further moved in the assembling direction, the inner elastic sealing member 5 climbs over the inner cylindrical portion 2B of the outer ring 2 while elastically deforming, and the assembling is completed as shown in the longitudinal cross-sectional side view of FIG. 2.

Since the inner cylindrical base portion 5A elastically deforms radially inward, the inner ring 1 can be relatively easily moved in the assembling direction even though the projection 7 is present.

Here, a lower surface 7B (see FIG. 3B) of the projection 7 of the inner elastic sealing member 5 is formed as a tilted surface which is reduced in diameter toward the lower side, whereby the workability of the work for assembling the inner ring 1 and the outer ring 2 such that the inner ring 1 and the outer ring 2 come close to each other in the axial direction is increased.

(Outer Elastic Sealing member)

Elastic deformation of the main lip 6B of the outer elastic sealing member 6 in performing the work for assembling the inner ring 1 to the outer ring 2 will be described with reference to a schematic longitudinal cross-sectional end view of FIGS. 5A, 5B, 5C, 5D and 5E.

Figure 5A:
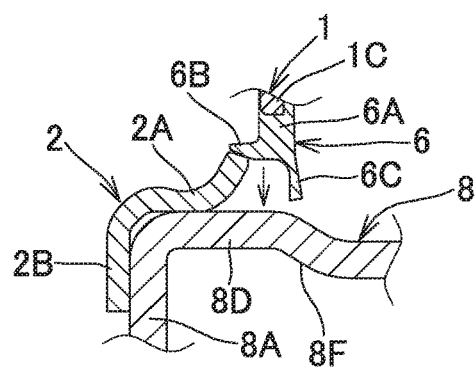
FIGS. 5A, 5B, 5C, 5D and 5E are schematic longitudinal cross-sectional end views showing a state of elastic deformation of a main lip of an outer elastic member during work for assembling the inner ring to the outer ring, wherein the assembling proceeds in order from FIG. 5A, 5B, 5C, 5D and FIG. 5E and is completed in FIG. 5E.

The main lip 6B is in a free state (a state where the main lip 6B is not elastically deformed) until the main lip 6B comes into contact with an upper end portion of the curved portion 2A of the outer ring 2 as shown in FIG. 5A from a state where the inner ring 1 and the outer ring 2 are away from each other in the axial direction.

Figure 5B:
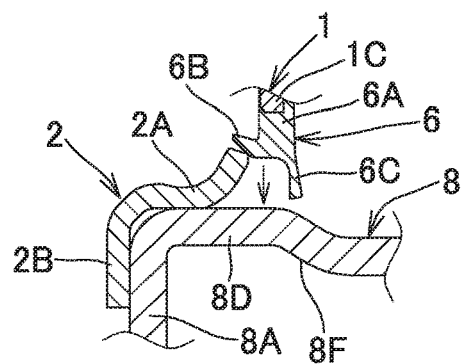
Figure 5C:
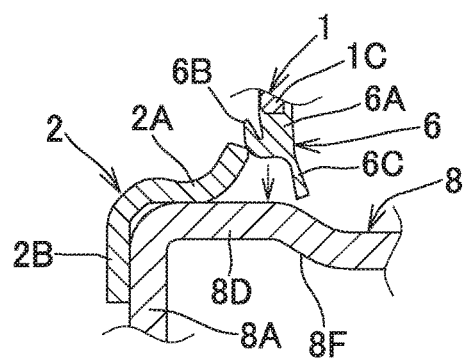
Figure 5D:
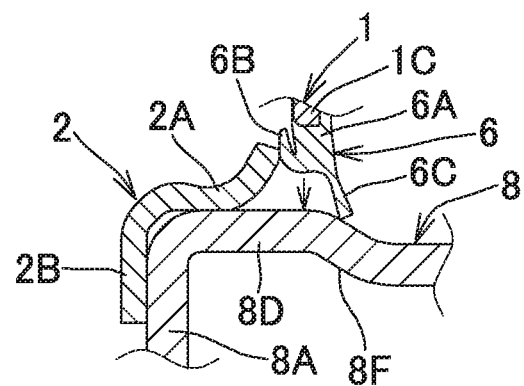

When the inner ring 1 is moved in the assembling direction relative to the outer ring 2 as shown by an arrow in the drawing from the free state, the main lip 6B that has come into contact with the upper end portion of the curved portion 2A of the outer ring 2 elastically and greatly deforms in a direction opposite to the assembling direction as shown in FIGS. 5B, 5C and 5D.

The restoring force generated by the elastic deformation of the main lip 6B in this state acts downward (in the assembling direction).

Since the outer cylindrical base portion 6A elastically deforms radially outward, the inner ring 1 can be relatively easily moved in the assembling direction even in a state where the main lip 6B has elastically and greatly deformed.

The main lip 6B that has elastically deformed moves downward while being in contact with the outer circumferential surface of the curved portion 2A of the outer ring 2. Since the outer circumferential surface of the curved portion 2A is tilted so as to be reduced in diameter toward the lower side (in the assembling direction), the elastic deformation of the main lip 6B gradually reduces, and the main lip 6B that has elastically deformed in the assembling direction reverses and elastically deforms in a direction opposite to the direction of the elastic deformation due to the restoring force (see FIG. 5E).

Figure 5E:
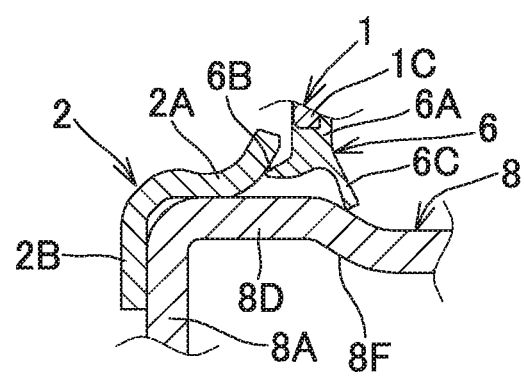

Then, in a state where the assembling is completed as shown in FIG. 5E, the main lip 6B is brought into pressure contact with the outer circumferential surface of the curved portion 2A which is tilted as described above, so that separation of the bearing is prevented. Thus, also in combination with having the function to prevent separation between the inner ring 1 and the outer ring 2 by the projection 7, it is not necessary to increase the restoring force of the elastic deformation of the main lip 6B in order to prevent separation of the bearing.

Embodiment 2

Figure 6:
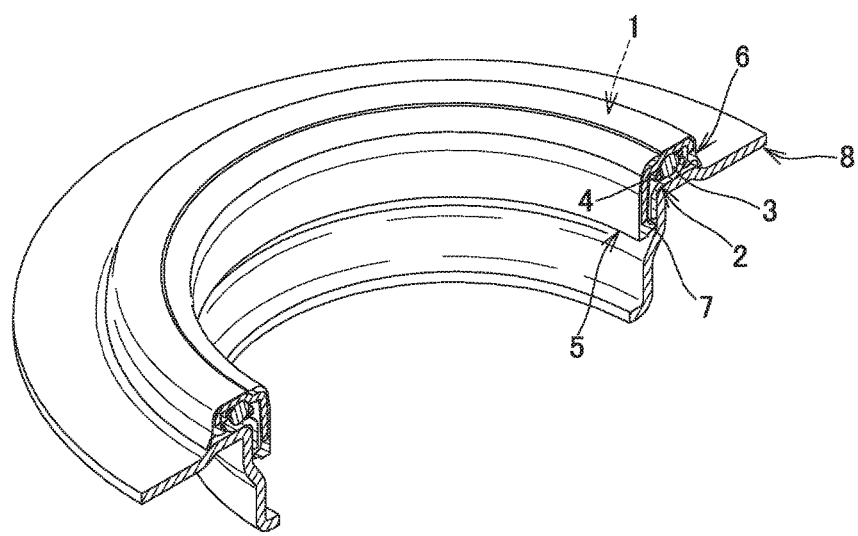
FIG. 6 is a longitudinal cross-sectional perspective view of a sealed thrust ball bearing according to Embodiment 2 of the present invention.
Figure 7:
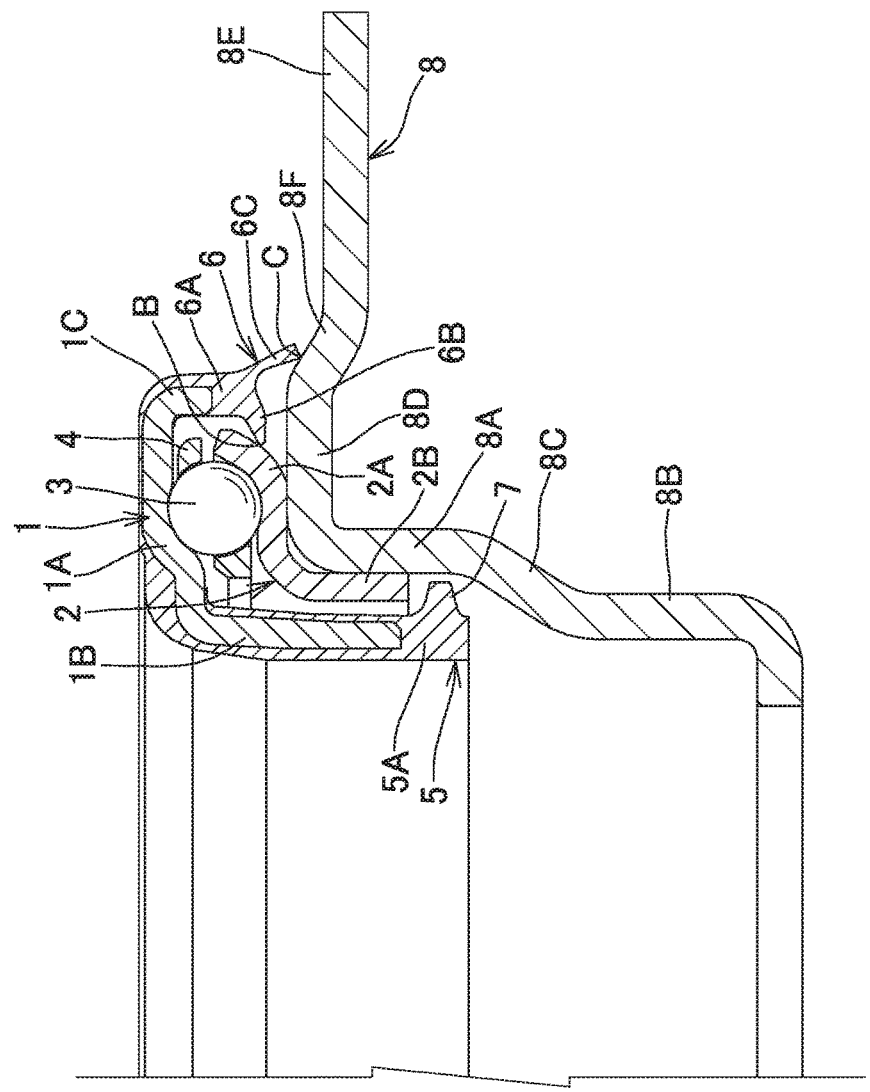
FIG. 7 is an enlarged longitudinal cross-sectional side view of a main part of the sealed thrust ball bearing.

In a sealed thrust ball bearing according to Embodiment 2 of the present invention shown in a longitudinal cross-sectional perspective view of FIG. 6 and a longitudinal cross-sectional side view of FIG. 7, the same reference characters as those in the sealed thrust ball bearing according to Embodiment 1 of the present invention shown in the longitudinal cross-sectional perspective view of FIG. 1 and the longitudinal cross-sectional side view of FIG. 2 denote the same or equivalent portions.

In the sealed thrust ball bearing of Embodiment 2, the lip 5B of the inner elastic sealing member 5 in the sealed thrust ball bearing of Embodiment 1 is eliminated.

Since the outer circumferential surface of the projection 7 provided at the outer circumferential surface of the inner cylindrical base portion 5A of the inner elastic sealing member 5 is spaced radially inward from the spring sheet 8, the projection 7 also serves as a labyrinth seal by adjusting the gap therebetween.

Therefore, depending on requirement specifications, the lip 5B in Embodiment 1 can be eliminated as in Embodiment 2. With this configuration, the running torque of the bearing is further reduced.

<Evaluation of Function to Prevent Separation Between Inner Ring and Outer Ring by Projection>

Comparative Example

The structure of the sealed thrust ball bearing of Patent Literature 3 was used as a comparative example.

Example

As an example, an outer elastic sealing member which is the same as that in the structure of the comparative example was used, and the inner elastic sealing member 5 formed with the same structure as that in FIG. 2 of Embodiment 1 was used. The projection 7 was provided on the entire circumference of the outer circumferential surface of the inner cylindrical base portion 5A.

(Evaluation Method and Evaluation Results)

The outer ring 2 was fixed, a load was applied to the inner ring 1 in the axial direction so as to separate the inner ring 1 from the outer ring 2 in the axial direction, and the separation load was measured.

The positions to which the load was applied were (a) a radially central portion of the inner ring 1 and (b) one location on the outer circumferential portion of the inner ring 1. The separation load when the load was applied to (a) is referred to as "inner-outer ring separation load", and the separation load when the load was applied to (b) is referred to as "separation prying load". The application of the load to the one location on the outer circumferential portion of the inner ring 1 was performed by forming a hole in the axial direction at one location on the outer circumferential portion of the inner ring 1, inserting a bolt through the hole, screwing a nut to a screw portion of the bolt, and applying a tensile load to the head of the bolt.

As a result, the "inner-outer ring separation load" of the example was 5.8 times that of the comparative example, and the "separation prying load" of the example was 9.6 times that of the comparative example, so that the separation load of the example was significantly larger than the separation load of the comparative example.

According to the configuration of the sealed thrust ball bearing configured as described above, when the inner ring 1 and the outer ring 2 are moved in the direction in which the inner ring 1 and the outer ring 2 are away from each other in the axial direction, the projection 7, which is provided at the inner cylindrical base portion 5A of the inner elastic sealing member 5 of the inner ring 1 and extends radially outward, is stopped by the lower end of the inner cylindrical portion 2B of the outer ring 2. Thus, the separation load is significantly increased.

Moreover, at the time of completion of assembling the inner ring 1, the outer ring 2, and the spring sheet 8, which is the lower member, the upper surface 7A of the projection 7 is spaced downward from the lower end of the inner cylindrical portion 2B of the outer ring 2, and the outer circumferential surface 7C of the projection 7 is spaced radially inward from the spring sheet 8. Thus, during rotation of the bearing, the projection 7 does not come into contact with another component, so that the running torque of the bearing does not increase.

Furthermore, in the sealed thrust ball bearing in which the lip 5B of the inner elastic sealing member 5 is brought into pressure contact with the pressure contact surface A in the radially inner surface of the spring sheet 8 and the dust lip 6C of the outer elastic sealing member 6 is brought into pressure contact with the pressure contact surface C in the upper surface of the spring sheet 8 as in the sealed thrust ball bearing of Embodiment 1, the outer ring 2 is sealed without being exposed to the outside air, so that rustproofing for the outer ring 2 becomes unnecessary. Thus, the production cost can be reduced.

While the invention has been described in detail, the foregoing description is in all aspects illustrative and not restrictive. It will be understood that numerous other modifications and variations can be devised without departing from the scope of the invention.

What is claimed is:

1. A sealed thrust ball bearing for use in a strut type suspension device, comprising:

an inner ring and an outer ring opposing each other in an axial direction;

a plurality of balls arranged between opposing surfaces of the inner ring and the outer ring so as to be able to roll; and an inner elastic sealing member and an outer elastic sealing member which seal between inner circumferential portions of the inner ring and the outer ring and between outer circumferential portions of the inner ring and the outer ring and are integrated with the inner ring by coating the inner ring with an elastic body, the sealed thrust ball bearing being used by assembling the outer ring to a lower member disposed below the outer ring, wherein the inner elastic sealing member includes an inner cylindrical base portion leading to an end portion of an inner cylindrical portion of the inner ring, and also includes, at an outer circumferential surface of the inner cylindrical base portion, a projection extending radially outward of an inner periphery of a lower end of an inner cylindrical portion of the outer ring, the outer elastic sealing member includes a lip extending radially inward so as to be brought into pressure contact with a pressure contact surface in a radially outer surface of the outer ring, and at a time of completion of assembling the inner ring, the outer ring, and the lower member, an upper surface of the projection of the inner elastic sealing member is spaced downward from the lower end of the inner cylindrical portion of the outer ring, and an outer circumferential surface of the projection is spaced radially inward from the lower member.

2. The sealed thrust ball bearing according to claim 1, wherein the outer elastic sealing member further includes a dust lip extending downward so as to be brought into pressure contact with a pressure contact surface in an upper surface of the lower member.

3. The sealed thrust ball bearing according to claim 1, wherein the inner elastic sealing member further includes, below the inner cylindrical base portion, a lip brought into pressure contact with a pressure contact surface in a radially inner surface of the lower member.

4. The sealed thrust ball bearing according to claim 1, wherein the outer elastic sealing member includes, above the radially inward extending lip, an outer cylindrical base portion leading to an end portion of an outer cylindrical portion of the inner ring, and the pressure contact surface in the radially outer surface of the outer ring is tilted such that, in assembling the inner ring and the outer ring such that the inner ring and the outer ring come close to each other in the axial direction, after the radially inward extending lip of the outer elastic sealing member is elastically deformed in an assembling direction or in a direction opposite to the assembling direction, the radially inward extending lip reverses and elastically deforms in a direction opposite to a direction of the elastic deformation at a time of completion of assembling, so that restoring force of the elastic deformation of the radially inward extending lip of the outer elastic sealing member is applied to the tilted pressure contact surface at the time of completion of assembling.

\* \* \* \* \*